(12) United States Patent
Hepler et al.

(10) Patent No.: US 9,951,486 B2
(45) Date of Patent: Apr. 24, 2018

(54) DURABLE DEBRIS AND ALKALINE RESISTANT PREFORMED THERMOPLASTIC RUNWAY PAVEMENT MARKING COMPOSITIONS

(71) Applicant: Flint Trading, Inc., Thomasville, NC (US)

(72) Inventors: Bradley Hepler, Lexington, NC (US); Robert W. Greer, Lexington, NC (US)

(*) Notice: Subject to any disclaimer, the term of this patent is extended or adjusted under 35 U.S.C. 154(b) by 168 days.

(21) Appl. No.: 14/886,977

(22) Filed: Oct. 19, 2015

(65) Prior Publication Data

US 2016/0186396 A1 Jun. 30, 2016

Related U.S. Application Data

(63) Continuation-in-part of application No. 14/734,563, filed on Jun. 9, 2015, which is a continuation of application No. 13/840,634, filed on Mar. 15, 2013, now Pat. No. 9,080,296, which is a continuation-in-part of application No. 13/240,209, filed on Sep. 22, 2011, now Pat. No. 9,765,489.

(51) Int. Cl.

| | |
|---|---|
| C09J 7/00 | (2006.01) |
| C09J 9/00 | (2006.01) |
| C09J 11/04 | (2006.01) |
| C09J 123/16 | (2006.01) |
| E01F 9/512 | (2016.01) |
| E01F 9/506 | (2016.01) |
| C09D 123/14 | (2006.01) |
| C09J 123/14 | (2006.01) |

(52) U.S. Cl.
CPC ............ *E01F 9/512* (2016.02); *C09D 123/14* (2013.01); *C09J 123/14* (2013.01); *E01F 9/506* (2016.02)

(58) Field of Classification Search
CPC ..... C09J 123/0853; C08L 95/00; E01F 9/512; E01F 9/578; E01F 9/041; E01F 9/042
See application file for complete search history.

(56) References Cited

U.S. PATENT DOCUMENTS

| | | | |
|---|---|---|---|
| 4,613,632 A | 9/1986 | Aliani et al. | |
| 5,194,113 A | 3/1993 | Lasch et al. | |
| 5,288,163 A | 2/1994 | Munson | |
| 6,552,110 B1 | 4/2003 | Yalvac et al. | |
| 7,175,362 B2 | 2/2007 | Carr et al. | |
| 7,744,306 B2 | 6/2010 | Greer et al. | |
| 2002/0115752 A1* | 8/2002 | Takamura | C08L 95/00 524/59 |
| 2003/0012599 A1 | 1/2003 | Wallgren et al. | |
| 2003/0069358 A1 | 4/2003 | Helland et al. | |
| 2003/0070579 A1 | 4/2003 | Hong et al. | |
| 2006/0074171 A1* | 4/2006 | Bach | C09J 123/12 524/487 |
| 2014/0272331 A1 | 9/2014 | Teng et al. | |

FOREIGN PATENT DOCUMENTS

| | | | |
|---|---|---|---|
| GB | 1485253 A | 9/1977 | |
| JP | 11209909 A2 | 8/1999 | |
| WO | 9828372 A1 | 7/1992 | |
| WO | WO 2011066355 A2 * | 6/2011 | ............ E01F 9/512 |

* cited by examiner

*Primary Examiner* — Christopher M Rodd

(57) ABSTRACT

Disclosed are PP/PE copolymer backbone based pre-manufactured thermoplastic airport signage compositions primarily applied in relatively large sections onto airport runways, taxiways, and additional paved surfaces. The composition provides alkali resistant formulations comprising at least 6 weight percent PE/PP, 20 weight percent binder resin with between 5 and 15 weight percent of a tackifier resin, between 2 and 12 weight percent titanium dioxide with an optional organic dye, wherein the intermix is at least 30 weight percent of the composition and wherein the intermix is an inorganic filler that greatly reduce or eliminate debris resistance when compared to other polymer backbone compositions.

29 Claims, 4 Drawing Sheets

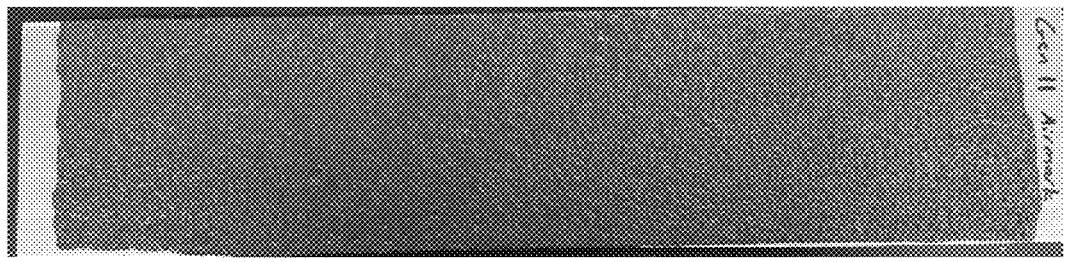
FIG. 2a: Comparative Example 1; Sample after 25 passes.
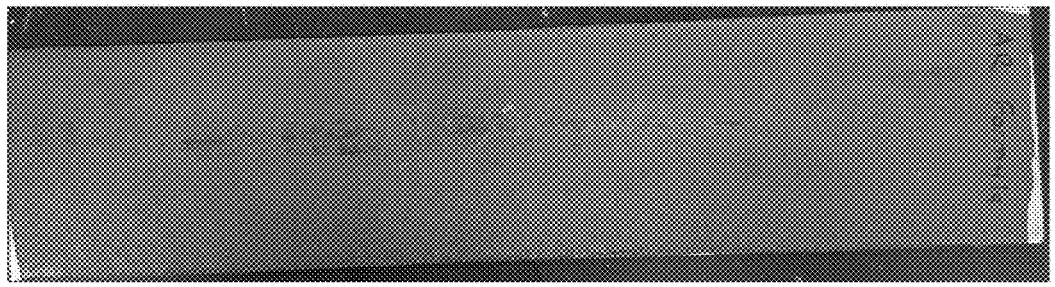
Fig. 2b: Comparative Example 2: Sample after 25 passes.
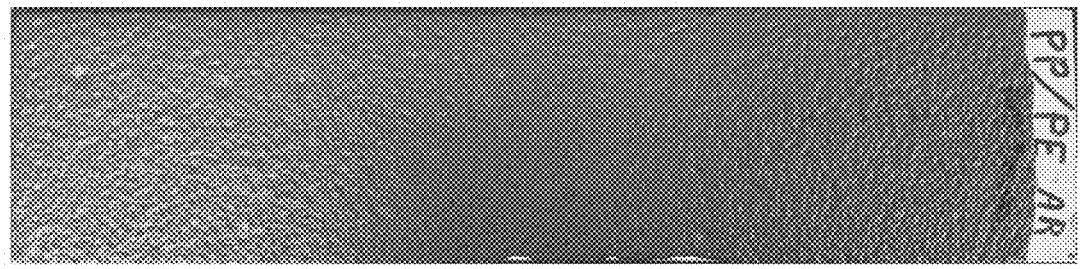
Fig. 2c: Example 1: Sample after 25 passes

US 9,951,486 B2

DURABLE DEBRIS AND ALKALINE RESISTANT PREFORMED THERMOPLASTIC RUNWAY PAVEMENT MARKING COMPOSITIONS

PRIORITY

This application is a Continuation-In-Part of pending U.S. patent application Ser. No. 14/734,563 filed Jun. 9, 2015 entitled "Alkaline Resistant Preformed Thermoplastic Pavement Marking Compositions" which is a continuation of U.S. patent application Ser. No. 13/840,634 filed Mar. 15, 2013, now U.S. Pat. No. 9,080,296, granted Jul. 14, 2015 of the same title. This application is also a Continuation-In-Part of pending U.S. patent application Ser. No. 13/240,209 entitled "Anti-Skid High Retro-reflectivity Preformed Thermoplastic Composites for Runway Applications" filed Sep. 22, 2011, and corresponding PCT Application PCT/US11/52733 filed Sep. 22, 2011 of the same title. This application claims priority to and benefit under 35 U.S.C. § 120 and § 119 and hereby expressly incorporates by reference, in their entirety the above mentioned U.S. Patent Applications.

FIELD OF THE INVENTION

The invention herein pertains to providing preform thermoplastic pavement marking compositions that include the use of polypropylene (PP) and polyethylene (PE) copolymers as the backbone of these compositions in lieu of polyamide (PA) or ethylene vinyl acetate (EVA) based compositions. These new compositions provide additional improvements in alkali resistance which is particularly important for providing longer lasting markings and maintaining the integrity of the pattern after application to alkaline substrates, such as concrete. The compositions of the present invention are used primarily for airport runways and taxiways to convey information to aircraft and aircraft support operators. The present invention also includes the additional features of high retroreflectivity and anti-skid properties while maintaining the necessary bonding characteristics to ensure the indicia is properly adhered to the runway and taxiway surfaces.

DESCRIPTION OF RELEVANT ART

U.S. Pat. No. 4,613,632 to Aliani, G. and assigned to Exxon Research & Engineering Company, describes ethylene copolymers for hot melt adhesive systems having an ethylene-vinyl acetate copolymer for final hot melt compositions also containing a binder resin and a plasticizer. The hot melt adhesive system is thermoplastic, containing from 5-15% by weight of EVA, but contains a plasticizer unnecessary to the proposed alkali resistant formulation of a preformed thermoplastic.

U.S. Pat. No. 5,194,113 to Lasch, et al., and assigned to Minnesota Mining and Manufacturing Company, describes a process for making a thermoplastic based conformable marking sheet, where the sheet comprises a thermoplastic polymer of 50-85 volume percent selected from a group to include polyamides, and bonding the top surface of the sheet to a top layer comprising a flexible thermoplastic polymer useful as a marking indicium where the flexible thermoplastic polymer to be selected from a group to include ethylene vinyl acetate (EVA). The disclosure provides for a thermoplastic marking applicable to a pavement surface containing a thermoplastic polymer in a high volume percent. A solventless process of embedding particles in thermoplastic pavement marking sheets is disclosed. Processes for preparing marking sheets are also disclosed. Conformant pavement marking sheets which may be applied in cooler conditions are also disclosed.

U.S. Pat. No. 6,552,110 to Yalvac, et al. and jointly assigned to Dow Global Technologies and Nor-Skilt, describes thermoplastic marking compositions. The subject invention pertains to thermoplastic marking compositions comprising a binder, which in turn comprise at least one homogeneous polymer. Accordingly, the subject invention provides a thermoplastic marking composition comprising: (a) from 10 to 80 weight percent of a binder, which in turn comprises: (i) from 1 to 99 weight percent of at least one homogeneous polymer; (ii) from 5 to 70 weight percent of at least one tackifier; (iii) from 0 to 10 weight percent of a polyethylene which has pendant acid functionality moieties of a non-functionalized wax; and (iv) from 0 to 20 weight percent of a plasticizer; and (b) from 20 to 90 weight percent of an inorganic filler. The subject formulations are usefully applied via spray, screed, and extrusion techniques.

US 20030069358 to Helland, et al, and assigned to 3M Innovative Properties Company, describes a thermoplastic composition containing polymeric fibers with a higher melting point than the thermoplastic composition containing it. Features for one embodiment of this invention are a pavement marking composition with synthetic polymeric fibers dispersed in a thermoplastic-based polymeric material, where the synthetic polymeric fibers have a melt point greater than the polymeric material. The fibers are randomly dispersed within the polymeric material. Use in pavement marking is practical where the polymeric material can be selected from the group comprising alkyd thermoplastic and hydrocarbon thermoplastic. Preferred hydrocarbon thermoplastic materials include acid containing ethylene copolymers, such as ethylene vinyl acetate.

U.S. Pat. No. 7,744,306 to Greer, et. al., the contents of which are hereby fully incorporated by reference, describes an alkyd resin-based pre-manufactured thermoplastic airport runway signage that is applied in relatively large sections onto an airport runway. The pre-manufactured preformed thermoplastic formed as a continuous sheet and wound onto a take-up spool. The runway surface is prepared with a two part primer with a viscosity in the range of 1-300 cps at room temperature and the preformed thermoplastic is unwound from the take-up spool and positioned onto the runway surface.

U.S. Pat. No. 7,175,362 to Carr, et. al., and unassigned describes a runway/taxiway system comprising a synthetic covering securely installed to an anchor positioned against but not attached to a runway/taxiway so that an edge of the covering is adjacent to an edge of the runway/taxiway and a growth retarding base placed beneath the synthetic covering and along a second side of the anchor with the base holding the anchor against the runway/taxiway.

U.S. Pat. No. 5,288,163 to Munson, William D, and unassigned describes a method for identifying airport taxiways and taxiway intersections by indicia a first taxiway with a continuous elongated row of first indicia identifying the first taxiway and indicia the first taxiway with a continuous elongated row of second indicia identifying an intersection with a runway or second taxiway beginning at least 100 feet in advance of the intersection. The spacing between the second indicia decreases with proximity to the intersection indicia the intersection along the route to be traversed between the first taxiway and the runway of second taxiway with a row of second indicia and indicia the runway or second taxiway with a row of second indicia after the intersection. The spacing between the second indicia increases with proximity to the intersection and said row of second indicia extends substantially along the centerline of the runway or second taxiway.

U.S. Patent Application No. 2003/0070579A1 (abandoned) to Hong, et. al., and unassigned describes a pavement indicia construction comprising a flexible layer with top and bottom surfaces. The top surface of the flexible layer is adapted for vehicular and pedestrian traffic with the flexible layer comprising at least one thermoplastic elastomer, at least one resin and a wax. The resin is substantially miscible with the thermoplastic elastomer upon cooling from a molten state and an adhesive lower layer adjacent the bottom surface of the flexible layer is adapted to adhere the flexible layer to a pavement surface.

WIPO Publication No. WO9828372A1 to Rogers, Barry Heith, and unassigned describes an indicia composition comprising a binder component and a reflective component comprising thin sheets or pieces of material which are essentially reflective.

Japanese Publication No. JP11209909A2 to Fikute, et. al., and assigned to Port & Harbour Res Inst Ministry of Transport describes a paving structure for paving an airport and its construction method which is excellent in torsion resistance, and dispenses with the provision of a joint and heating in the case of execution. A room temperature asphalt mixture including an aggregate, an asphalt emulsion mixed with the aggregate in a state where a volume is increased by bubbling and a hydraulic setting inorganic material is paved, and after paving, a thermoplastic high-molecular polymer is supplied on the room temperature asphalt mixture and rollingly pressed to form a surface layer integrated with the paved room temperature asphalt mixture. Thus, a paving structure for paving an airport constructed in this way can be provided.

The disclosed review of relevant art indicates the need for preform thermoplastic compositions providing better alkali and debris resistance for thermoplastic markings specifically designed for alkaline concrete, efflorescence, and wet climates. The need to create maintain the integrity of the pattern using a thermoplastic pavement marking composition that includes primarily a polypropylene/polyethylene (PP/PE) copolymer as a replacement for commonly used polyamide and/or ethylene vinyl acetate (PA and/or EVA) polymers.

BACKGROUND

Traffic markings convey information to drivers and pedestrians by providing exposed visible, reflective, colored and/or tactile surfaces that serve as indicia. In the past, this function was typically accomplished by painting traffic surfaces. Modern marking materials offer significant advantages over paint by dramatically increasing visibility and/or reflectance, improving durability, and temporarily removable marking options. Examples of modern pavement marking materials include; thermoplastics, pavement marking sheet materials, tapes and raised pavement markers.

Preformed and hot applied thermoplastic materials used as pavement markings or for other indicia possess many advantages compared to paints and other less durable markings. These materials can provide years of service life as opposed to paints and other techniques. Known materials include using high friction aggregates on the surface to improve friction. The surface applied aggregates provide good initial values, however as the surface is worn due to traffic, the skid resistance decreases. After surface layers containing anti-skid materials become worn out, these aggregate materials lose their effectiveness and become slippery because they do not contain high friction particles (of sufficient size to provide good skid properties).

Current thermoplastics include the use of primarily polyamide (PA) and/or ethylene vinyl acetate (EVA) resins which have been shown to be unstable and often disintegrate in the presence of alkaline (pH of 8 or greater) environments. Certain (often newer) concrete compositions can also often become caustic and more highly alkaline in the presence of moisture after precipitation laden weather events. Today's preform thermoplastic materials do not include alkaline resistant properties using copolymers of polypropylene (PP) and polyethylene (PE) resins primarily due to the lack of understanding of the effects of alkalinity on long term durability of these olefin resins. Many of the preformed thermoplastic decorative patterned material compositions currently employed for runway applications deteriorate rapidly in the presence of these alkaline environments.

A review of these issues demonstrates the need for thermoplastic products that provide alkali resistance to marking products for installation on paved airport (and alkaline road) surfaces and also ensures that the integrity of the product (and pattern if so desired) is maintained after installation.

Airport pavement indicia and signs provide information that is useful to a pilot during takeoff, landing, and taxiing. Generally airport indicia are grouped into four categories: runway indicia, taxiway indicia, holding position indicia, and other indicia. Indicia for runways are white. Indicia for taxiways, areas not intended for use by aircraft (closed and hazardous areas), and holding positions (even if they are on a runway) are yellow. Indicia for heliports are white with the exception of medical helicopter areas which are white and include a red cross.

Most of the runway and taxiway information provided today still employs paint onto concrete or asphalt surfaces. This paint may last for several weeks or several months depending on the amount of use, the size of the aircraft traffic using it, and/or the severity of environmental conditions.

It has been found that uniformity in airport indicia and signs from one airport to another enhances safety and improves efficiency. FAA Standards AC 150/5340-1 "Standards for Airport Indicia" and AC 150/5340-18 "Standards for Airport Sign Systems" are both references that define the minimum requirements for airport indicia and signage. Non-maintenance of painted indicia may allow indicia to deteriorate to a point where the information being conveyed is confusing or illegible.

Runway indicia may also be divided into the following groups: visual runway indicia, non-precision instrument indicia and precision instrument indicia. Additional indicia are required for runway lengths over 4000 feet and for runways serving international commercial transports.

Maintenance of the painted surfaces require that runways and taxiways be shut down while the surface is prepared, paint is applied and for required curing time(s). Maintenance of a particular runway may impact the holding and taxiways of adjacent or intersecting pavement. The pavement warnings of adjacent or intersecting pavement must change to denote changes in holding areas, and thresholds to avoid ground collisions with other aircraft.

Presently many airports have allocated budgets for painting the warning, identification and directional indicia. Painting the runway surfaces is performed on a rotational basis which is normally once every three weeks, depending on the volume and size of the aircraft traffic. Although the painting of the runway surface is relatively quick, runway traffic still needs to be rerouted to other runways. This causes flight delays while the painting and drying of the painting occurs. It is also is expensive to continue using these methods in that full time painting crews are continually rotating from runway to runway.

Ground safety remains a problem at busy airports across both the United States and internationally. The movement of aircraft in and around busy airports along taxiways between terminal gates and runways presents numerous opportunities for runway incursions, particularly when visibility is poor. A runway incursion is the entry of an aircraft without clearance onto an active runway from an adjacent ramp or taxiway, for which there is a great deal of risk of collision with a landing or departing aircraft. Incursions are often the inadvertent result of pilot disorientation caused by poor visibility.

Incidents associated with poor or inadequate airport indicia such as taxiway collisions or near misses resulting from vehicle operators mistaking one taxiway for another have occurred. Runway incursions and other taxiway incidents still represent inconvenience and expense even when a ground collision does not result. To return an aircraft to a path from which it has strayed requires a considerable expenditure of time and fuel, and a compromise to the safety of all involved.

In addition to the need for runway signage that is relatively simply and quick to apply and that exhibits exceptional wear characteristics as well as allowing for delayed intervening scheduled maintenance, thereby assisting with the reduction of the cost of maintenance, delayed flights and confusion due to runway rerouting, the signage should also be highly retroreflective and skid resistant.

In addition, the need for high retroreflectivity nighttime visibility has been increased to about 1000 millicandellas/m$^2$/lux (mcd) and this relatively high (with respect to earlier requirements) retroreflectivity requires glass beads that must remain at or near the top surface of the signage to ensure that the retroreflectivity is maintained during and after installation. To create the proper composition of the polypropylene/ethylene (PP/PE) copolymer-based preformed thermoplastic compositions that meet all of these requirements has been a recent challenge and below are listed some embodiments of the present disclosure.

SUMMARY

The present disclosure describes a preformed thermoplastic pavement marking or hot melt applied material with improved extreme alkali resistance once the pavement marking has been adhered to runway/road surfaces or other solid substrates. The need exists to produce preformed thermoplastic pavement marking materials with improved and extreme alkali resistance as well as debris resistance especially for use in wet, humid, and/or hot conditions that are primarily adhered to concrete surfaces. For airport runways, for example, longer term use (as compared with painted surfaces) with the thermoplastic preforms is necessary to guard against the aggressive and caustic nature of concrete substrates to which they are adhered. The preformed thermoplastic material of the present invention is comprised of at least 20% by weight binder and up to 80% by weight of the "intermix", where the intermix includes inorganic substances such as silica, calcium, aggregate and other normally organic pigments. In this specific instance, the binder is at least 27% by weight and the intermix 73% by weight or less.

More specifically, the specification provides for an invention where the preformed or hot applied thermoplastic marking composition comprises at least 6 weight percent of a polyethylene/polypropylene copolymer, The composition further comprises an intermix that exists throughout the thermoplastic composition wherein the composition is at least 20 weight percent binder resin which further comprises between 5 and 15 weight percent of a tackifier resin between 2 and 12 weight percent titanium dioxide with an optional organic dye, wherein the intermix is at least 30 weight percent of the composition and wherein the intermix includes one or more inorganic fillers.

Even more specifically, the composition also comprises;
at least 10 weight percent of one or more sterically hindered phenolic antioxidants;
at least 1 weight percent of one or more of;
a PE homopolymer wax along with at least 1 weight percent of a non-polar polyethylene component containing 3 percent ethylene maleic anhydride yielding a saponification number of 35;
at least 1 weight percent alkyd resin and soybean oil mixtures;
at least 0.5 weight percent of one or more UV stabilizing compounds;
at least 1 weight percent of an alkyd resin modified glyceryl phthalate;
at least 1 weight percent of a polyurethane with a melting point of at least 150 degrees centigrade and;
a heat stabilizer that is a disodium salt of phosphonic acid.

The tackifier resin of the composition can be comprised of a glycerol ester of a rosin resin.

This composition has a glass transition temperature of 121 degrees Centigrade.

Further the composition includes one or more sterically hindered phenolic antioxidants that are pentaerythritol tetrakis(3,3,5 di-tert-butyl-4-hydroxyphenyl)propionate).

One embodiment of the present composition includes a UV stabilizing compound that is poly[(6-morpholino-s-triazine-2,4-diyl)[2,2,6,6-tetramehtyl-4-piperidyl)imino]-hexamethylene[(2,2,6,6-tetramethyl-4-piperidyl)imino]).

It is also possible for the composition to possess an intermix of at least 60 to 80 weight percent of the total composition.

The composition may also contain inorganic filler that is at least 30 weight percent calcium carbonate, glass beads, fumed silica, and aggregate.

The composition also may contain aggregate comprising quartz, granite, corundum, calcined clay, metal slag or any combination of said quartz, granite, corundum, calcined clay, or metal slag.

The preformed or hot applied thermoplastic composition should also meets the following test criteria; 119 degrees Centigrade in the ring and ball test, 126 percent elongation in the cold flow test at 135 degrees Centigrade, 156 indent value in the indent value test, and passes the alkalinity test.

Additionally, the preformed or hot applied thermoplastic composition preform measures a dynamic modulus, G' at 77° C. of between 3.0 and 13.0 (MPa)

The preformed or hot applied thermoplastic marking composition comprises at least 6 weight percent polypropylene/polyethylene (PP/PE) copolymer, wherein the composition includes a planar top surface portion and a bottom planar portion that are coplanar to each other, wherein the bottom portion is directly applied to an alkaline substrate wherein alkalinity of the substrate is measured by pH and the pH is greater than 8.0 and wherein the preformed thermoplastic is adhered to the substrate via application of heat or pressure or both heat and pressure and wherein the top surface portion and bottom planar portion comprises an intermix that exists throughout the thermoplastic composition.

The preformed or hot applied thermoplastic composition may have more than one top surface and bottom portion of the preformed thermoplastic marking utilizing an adhesive for bonding and interlocking one section of the preform to another section of the preform so that more than one section of the preform can be bonded to another section of the preform, thereby providing a patterned preformed thermoplastic marking.

The top surface portion includes patterned markings, wherein the patterned markings are lines, legends, arrows, indicia, including colored surfaces and sections of said surfaces other than or together with a white color.

The adhesive is sprayable and alkaline resistant, allowing for bridging an intersection on the planar bottom surfaces of a grid section and an insert section such that the grid and insert section form a unified pavement marking pattern and wherein the adhesive includes a PP/PE based hot melt adhesive.

A method for making a preformed or hot applied thermoplastic marking for adhesion to an alkaline substrate also exists wherein the marking comprises at least 6 weight percent of a PP/PE copolymer and wherein the marking also includes a planar top surface portion and a planar bottom portion that are coplanar to each other, wherein the bottom portion is directly applied to said alkaline substrate that exhibits a pH greater than 8.0 and wherein the preformed thermoplastic is adhered to the substrate via application of heat or pressure or both heat and pressure and wherein the top surface portion and the bottom surface portion comprises an intermix that exists throughout the thermoplastic composition.

The method described also comprises an intermix that exists throughout the thermoplastic composition and wherein the composition is at least 20 weight percent binder resin which further comprises between 5 and 15 weight percent of a tackifier resin that is glycerol ester of a rosin resin, between 2 and 12 weight percent titanium dioxide with an optional organic dye, wherein the intermix is at least 30 weight percent of the composition and wherein the intermix is an inorganic filler.

The composition may also include inorganic filler that is at least 30 weight percent glass beads and additionally may include calcium carbonate, fumed silica, and aggregate.

The composition also may include glass beads suspended in and applied on the surface of the resin-based composite (that is taken from the preform thermoplastic composition) in the molten state so that the beads do not sink into the resin-based composite and the beads allow for maintaining an overall retroreflectivity of about 1000 millicandellas/m$^2$/lux (mcd), and wherein the resin-based composite is formed as a continuous sheet wound onto a take-up spool and wherein the resin-based composite is subsequently unwound and positioned to conform to large substrates and subsequently the signage is heated to a predetermined temperature providing optimal adhesion of the resin-based composite to the large substrate; and wherein the signage includes features that allow edges of the signage to physically interconnect and interlock with edges of other signage with the same or other features allowing the continuous sheet to be wound or unwound from spools for specific transportation and site placement.

The composition provides for signage of the resin-based composite that is cut to specific lengths and widths conforming to FAA Standards AC 150/53404-1 and AC 150/5340-18 included for touchdown indicia, threshold indicia configurations, aiming point indicia, and centerlines for precision instrument runways.

The thermoplastic signage may include an alphanumeric symbol on a pavement surface area for surface indicia materials existing on a top surface.

The thermoplastic signage of the resin-based compositions is normally comprised of various colors and hue(s) integral and permanently molded into the resin-based composition.

The thermoplastic signage is normally provided with large surfaces of signage which is trafficked within minutes after adhering the signage to any suitable aviation associated substrate.

The thermoplastic signage may display specific helicopter landing and takeoff indicia including medical transport indicia.

In addition, the thermoplastic signage is heated to a predetermined temperature to ensure proper and optimal adhesion between the signage and any suitable aviation associated substrate and the temperature is normally about 400 degrees Fahrenheit.

The copolymer of PP/PE can be a singular resin from a singular supplier or combined with more than one resin from multiple suppliers.

One preferred resin is known as an amorphous metallocene (a catalyst used to ensure proper polymerization of olefins) propylene-ethylene-copolymer wax with; a density of approximately 0.90 gm/cm$^3$, a viscosity in the range of 9000-9500 (9300 is the preferred value) mPa-s as measured according to the DIN 53019 standard test method at 170 C, and a softening point of 111 C as measured according to ASTM D 3104. This specific copolymer is manufactured by Clariant and marketed under the tradename "Licocene® PP 3602 granules TP" and is a useful choice for a backbone polymer for these hot melt adhesives without significant residual tack and providing exceptional adhesion. Another preferred resin is listed under the tradename "Vistamaxx™ 3588 FL" manufactured by ExxonMobil and is an isotactic propylene copolymer with random ethylene distribution also produced via metallocene catalyst technology. This PP/PE copolymer is characterized by having a density of 0.889 gm/cm$^3$ as measured by ASTM D1505 with an ethylene content of 4 weight percent and a Vicat softening temperature of 103 C as measured internally within ExxonMobil laboratories.

In one embodiment, the combination of the two PP/PE resins are provided in the ratio of 70:15 lbs per 1000 lbs of a completed preform composition. Surprisingly, not only do these backbone polymer resins provide the needed alkali/caustic resistance but also either greatly reduce or eliminate debris, which normally builds up on the preform surfaces as a result of air traffic. The debris is normally the result of rubber from tires which can adhere to the surface of the preformed thermoplastic.

There is a strong need in the industry to provide a preformed thermoplastic so that these marking surfaces remain alkali and caustic resistant and can be used for any application. In order to achieve this desired result, the alkali resistant preformed road marking compositions must include relatively high levels of PP/PE copolymer, specifically in the range of 8 to 16 weight percent of the total composition in comparison with the currently used compositions. In the past, the use of either EVA or PA have been the only choices for the backbone of the total composition of these products.

BRIEF DESCRIPTION OF THE DRAWINGS

FIG. 2a is a photograph of comparative example 1, which is sample after 25 passes.

FIG. 2b is a photograph of comparative example 2 which is a Sample after 25 passes.

FIG. 2c is a photograph of example 1 after 25 passes

DETAILED DESCRIPTION

Figure 1:
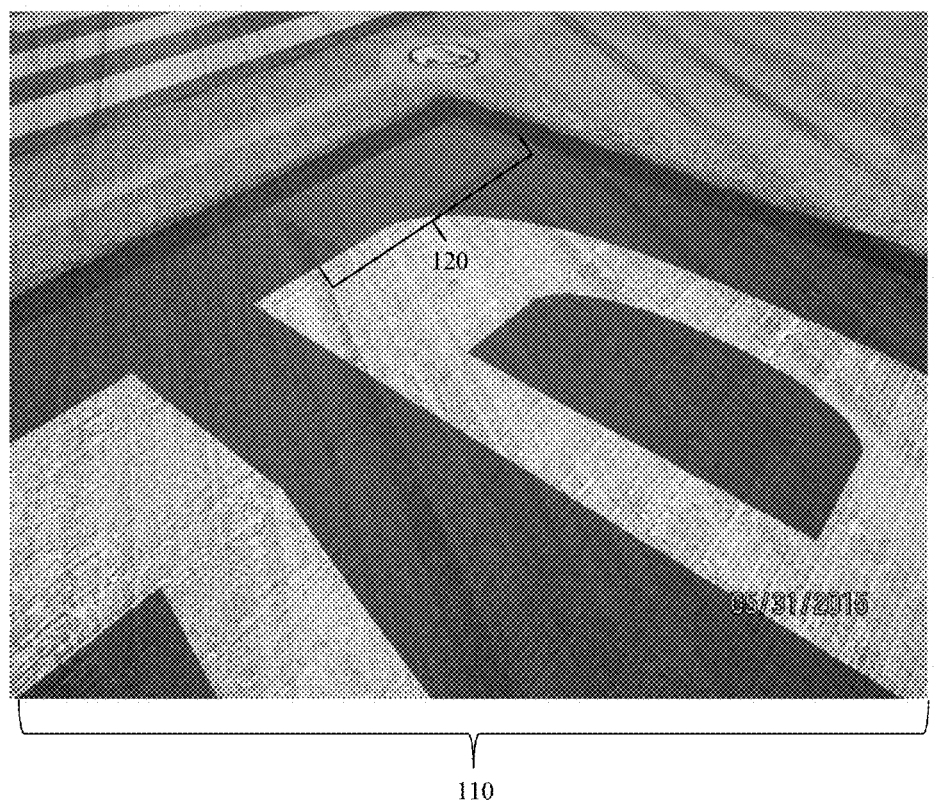
FIG. 1 is a photograph of an EVA based alkaline resistant material (Comparative Example 2) 24 hours after installation. The rectangular section that appears a different shade of red is PA based non alkaline resistant material (Comparative Example 1). Note the severe debris pick-up is limited to the EVA based material.

To achieve the desired alkali resistance, replacement of fatty acid dimer based polyamide resins such as Uni-Rez 2633, from Arizona Chemical, is required. Direct replacement can be costly but effective, however, often additional stabilizers and plasticizers are also needed in the final composition to endure the longer term flexibility and stability demands on preformed thermoplastic pavement markings. For example, specific PP/PE copolymers are manufactured by Clariant and marketed under the tradename "Licocene® PP 3602 granules TP" which are a useful choice for a backbone polymer for hot melt adhesives without introducing significant residual tack while still providing exceptional adhesion to pavement surfaces. Another useful PP/PE copolymer resin is listed under the tradename "Vistamaxx™ 3588 FL" and is manufactured by ExxonMobil. This is an isotactic propylene copolymer with random ethylene distribution also produced (as is the Licocene copolymer) via a metallocene catalyst technology. This PP/PE copolymer is characterized by having a density of 0.889 gm/cm$^3$ as measured by ASTM D1505 with a ethylene content of 4 weight percent and a Vicat softening temperature of 103 C as measured internally within ExxonMobil laboratories. Use of these copolymers together with ester modified rosins, fillers, extenders, levelers and other conventional components completes these alkali resistant air traffic pavement compositions.

The general alkali resistant formulation of the present disclosure more specifically comprises at least 20 weight percent binder resin which further comprises between 5 and 15 weight percent of a tackifier resin that is glycerol ester of a rosin resin. Normally, at least 10 weight percent of one or more sterically hindered phenolic antioxidants; at least 1 weight percent of one or more PE homopolymer waxes along with at least 1 weight percent of a non-polar polyethylene component containing 3 percent ethylene maleic anhydride yielding a saponification number of 35 are added to the composition. The composition also typically includes alkyd resin and soybean oil mixtures, at least 0.5 weight percent of one or more UV stabilizing compounds; at least 1 weight percent of an alkyd resin modified glyceryl phthalate, at least 1 weight percent of a polyurethane with a melting point of at least 150 degrees Centigrade and a stabilizer that is a disodium salt of phosphonic acid. In addition, between 2 and 12 weight percent titanium dioxide with an optional organic dye, wherein the intermix is at least 30 weight percent of the composition and wherein the intermix is an inorganic filler is incorporated into the composition.

Common test methods for measuring the effectiveness of these pavement markings for alkali resistance include BS EN 1871:2000 and also includes methods for testing heat stability, cold impact, softening point, indentation, and wear resistance. All of these parameters are important in finalizing compositions which meet the needs of the alkaline concrete environments that are adhered to and a portion of the subject of the present disclosure.

It has also been shown that it is possible to use single grit size aggregate in the intermix. The use of an intermix of different grit sized aggregates in different proportions based on the need for the future use of different materials (larger sizes for thicker and larger thermoplastic sheets and smaller aggregates for narrow strips) is also part of the present disclosure. For calcium carbonate particles of the present disclosure, one preferred product is marketed under the tradename Carbonate G260®. This particular calcium carbonate provides a mean particle size of 22 microns, a Hunter dry brightness reflectance of 93.5 and an oil absorption capacity of 12 lbs oil/100 lbs of calcium carbonate as determined by ASTM D-281 with a weight percent moisture measured to be 0.2% by ASTM D-280. The particle mesh size is between 60 and 325.

In the present disclosure, the use of uniform particulate material or blends of particulate materials for the aggregate with differing hardness values that provide more economical solutions, can be introduced into the intermix during formulation. The introduction of these blends usually occurs prior to extrusion and completion of the thermoplastic pavement marking. The aggregates and other particles such as glass beads and the inorganic choices stated above can also be dropped on the hot material during installation and completely embedded into body of the thermoplastic marking material in that fashion. The preformed thermoplastic surface marking product can be applied using pressure sensitive adhesives as well as by flame torching.

These marking patterns often consist of two or more independent sections which should be carefully assembled and handled before applying to pavements such as asphalt, concrete or other suitable substrates. In addition to being applied to air traffic pavement surfaces, these marking patterns may be placed at desired locations such as road crosswalks, intersections, parking lots or other sites. In some cases heat is then applied to soften the pavement marking pattern causing it to firmly adhere to the substrate. Various adhesives can also be used to adhere the marking pattern to the substrate.

The original AirMark® (which is also a composite) may be initially rolled and then melted onto the runway surface using an 8 foot to 16 foot wide IR heater. Hand held propane torches may also be used, such as the Flint 2000EX, available from Flint Trading, Inc. The material thickness of this runway signage is nominally 0.060 inches. The signage without high retroreflectivity and anti-skid properties has a backing that is relatively thin and flexible and normally utilizes a relatively low viscosity (50-500 centipoise—cps) two component primer, such as an epoxy primer. The composition of the present invention is not rolled but instead are transported and provided in large flat sections to runway locations for installation.

An embodiment of the present disclosure requires the need and use of a two part epoxy primer which is nominally in the narrow viscosity range of 50-500 cps at room temperature for ensuring proper and optimal bonding to a runway or taxiway surface. Lower or higher viscosity epoxy primers do not work well for the present disclosure and associated invention due to the change in the functional composition/composite of the runway/taxiway signage. This composition/composite was described, in detail, above.

To acquire the reflective properties necessary, glass beads with specific sizes such as described in the Federal Aviation Administration (FAA) document TT-B-1325 D, issued Jun. 1, 1993, are both embedded within the sheet and also strategically placed over the sheet during the heating and installation procedure which is described in the next paragraph.

In addition to retroreflectivity, skid resistance, which in this case is defined as the raising of the surface friction coefficient of the preformed thermoplastic indicia layer onto the runway/taxiway to prevent slippage of airport personnel, must also be increased. During moist or wet weather conditions, there have been worker accidents attributed to slick painted indicia as well as for preformed thermoplastic AirMark® signage. It is also necessary to add debris resistance to the list of desirable properties.

Use of anti-skid materials within the preformed thermoplastic sheets including corundum, quartz, sand, etc., all of which are used to increase the coefficient of friction, but must be achieved within the set of parameters as described above, namely the preformed thermoplastic sheets in the molten state, must exhibit a viscosity of between 35,000 and 85,000 cps during installation. This molten state is normally achieved at or about 150 degrees Centigrade or generally above 300 degrees Fahrenheit, and with the incorporation of the anti-skid materials, optimization of the viscosity is more difficult to achieve. A lower viscosity composite will allow the glass beads to sink and thereby greatly diminish or eliminate retroreflectivity intensity, while a higher viscosity preformed thermoplastic will not sufficiently bond with the runway/taxiway surface.

The runway surface is prepared with the two-part epoxy primer and the preformed thermoplastic is unwound from the take-up spool and positioned onto the runway surface. When the preformed thermoplastic signage is in a desired location it is initially rolled conforming to the runway surface. Heat is applied to the rolled surface to a temperature of or about 300° F. degrees with this particular preformed plastic sheet composition. Fusing with a wide infra-red (IR) heater to melt the preformed thermoplastic signage into the runway surface allows for adhering the preformed thermoplastic signage to the runway surface.

The modified formulation and resulting composition of the present disclosure increases the viscosity of the preformed thermoplastic in order to retard bead sinking Non-conventional two-part epoxy sealers were necessary (within a narrow—50-500 cps range at room temperature) were required so that optimal bonding together with optimal retroreflectivity could be obtained.

In an additional embodiment the pre-manufactured thermoplastic signage is flexible and the material thickness is in a range of 0.050 inches-0.075 inches with a nominal thickness of 0.060".

Another embodiment includes the ability of the large pre-manufactured thermoplastic signage to be installed quickly and easily to concrete or asphalt surfaces.

In another embodiment the pre-manufactured thermoplastic signage may also be applied to fresh asphalt surfaces as soon as the asphalt has cured to a "set".

An additional embodiment includes the fact that the pre-manufactured thermoplastic signage may have features such as indents, bumps or marks that are visible indicators such that correct adhesion temperature are attained by the infra-red or other heating means used by those skilled in the art.

In another embodiment the pre-manufactured thermoplastic signage is prepared to meet specific lengths and widths conforming with FAA Standards AC 150/5340-1 "Standards for Airport Indicia" and AC 150/5340-18 "Standards for Airport Sign Systems" for touchdown indicia, threshold indicia configurations, aiming point indicia and centerlines, as requirements for precision instrument runways.

In yet another embodiment the pre-manufactured thermoplastic signage is provided as alphanumeric symbols for specific information signage that is applied to the runway, taxiway or holding surface.

In another embodiment the pre-manufactured thermoplastic signage is available in various colors or hues.

In another embodiment the pre-manufactured thermoplastic signage has features that allow the edges to physically interconnect and interlock.

An embodiment of the disclosure is that the pre-manufactured thermoplastic signage is available for traffic within minutes of adhering the specific signage.

Additionally as another embodiment, the pre-manufactured thermoplastic signage identifies areas for aircraft support vehicles or outdoor passenger loading in non-runway areas.

An additional embodiment for the pre-manufactured thermoplastic signage identifies specific helicopter landing and takeoff areas including medical transport.

Among additional objectives of the invention include providing a relatively inexpensive pavement marking pattern having two or more sections in which the sections are joined by use of an applied alkaline resistant adhesive and to provide a method for forming a pavement marking pattern which allows cost efficient factory assembly of the pattern and which prevents dislodging and separation of the pattern sections during handling, transportation and application.

It should be understood that although examples are given it should not be construed that these are examples provide the only examples of the invention and that variations of the present invention are possible, while adhering to the inventive concept herein disclosed.

EXAMPLES

The following examples are not intended to limit the scope of the invention as described in this disclosure, but instead to provide examples of the invention and associated possible compositions.

Example 1

An example of the PP/PE copolymer resin formulation (composition) for the preformed thermoplastic of the present invention is provided as follows:

Material composition for Example 1 by weight percent

| | |
|---|---|
| Intermix Bead M247 Highway | 30% |
| Calcium carbonate | 18% |
| Sand/Quart 5-0 grit | 15% |
| Rosin Ester GA-90 (Arikawa) | 10.3% |
| Licocene PP 3602 - PP/PE copolymer (Clariant) | 7.0% |
| Vistamaxx 3588 - PP/PE copolymer (ExxonMobil) | 1.5% |

-continued

| | |
|---|---|
| TP-150 polyurethane (Cekapel) | 1.5% |
| Alkyd resin with glyceryl phthalate (Cristicol) | 1.4% |
| Alkyd resin and soybean oil (Ranbar) | 1.2% |
| AC575 PE Wax (Honeywell) | 1.0% |
| UV polytriazine imino stabilizer (Cytec UV 3346) | 0.70% |
| Phenolic Antioxidant (Irganox 1010 - BASF) | 1.6% |
| Phosphoric acid disodium salt (Bruggolen) | 0.08% |

This composition can be contrasted with previous compositions, a standard PA based type of which is given in the Comparative Example 1 below;

Comparative Example 1

As an illustration, Comparative Example 1 uses polyamide (PA) resin with the intermix.

Material Composition for Comparative Example 1 by weight percent

| | |
|---|---|
| Polyamide resin Uni-Rez 2633 - | 7.5% |
| Modified rosin resin Sylvacote 4981 - | 8.5% |
| Phthalate plasticizer - | 3.0% |
| PE based wax - | 2.0% |
| Fumed silica - | 0.5% |
| Corundum grit 30 | 18.5% |
| $TiO_2$ | 10% |
| $CaCO_3$ | 20% |
| AASHTO Glass Beads Type 1 | 30% |

An alkaline resistant formulation that describes one embodiment as an example of the composition of the present disclosure was prepared according to Example 1 above. As previously described, the PA (polyamide) and EVA (ethylene vinyl acetate) compositions that were developed over the last decade (including Comparative Examples 1 and 2 listed) tend to decompose in the presence of high alkalinity and become water soluble.

Material Composition for Comparative Example 2 by weight percent

| | |
|---|---|
| EVA Resin - | 10% |
| Modified rosin resin - | 10.86% |
| PE based wax - | 3.0% |
| Modified PE Wax - | 1.0% |
| Antioxidant - | 0.24% |
| Hindered Amine Light Stabilizer - | 0.5% |
| Grit | 22.2% |
| $TiO_2$ | 10% |
| $CaCO_3$ | 12.2% |
| AASHTO Glass Beads Type 1 | 30% |

By substituting PP/PE copolymers for PA and EVA, the composition was no longer subject to damage in high alkalinity environments situation and debris transfer was significantly reduced, as provided in FIG. 1. EVA based alkaline resistant material (Comparative Example 2) [110] was photographed 24 hours after installation. The rectangular section that appears a different shade of red is polyamide based non alkaline resistant material (Comparative Example 1) [120]. Note the severe debris pick-up in this case is limited to the EVA based material.

Methods to determine alkalinity and debris resistance that have been developed and for which this (and other) recent composition(s) were tested are provided below;

Tire Smear Test

Samples of the Example 1 composition were installed on aluminum backed panels using both IR heat and a direct flame Flint 2000 torch. Samples were then allowed to cool overnight before being tested. Samples had aircraft tires passed over them for 120 hours with 1500 pounds of pressure applied at a rate of 7 passes per minute for a total of 50,000 passes. Samples were then observed for level of rubber transfer to material.

Tire Scrub Test

Samples of the Example 1 composition were cut to 19"×4" sheets. Samples were then loaded into an Elcometer abrasion tester. A tire was then cut to size and fastened to a block and inserted in place of a traditional brush and scrub medium. The tire was passed across the material with a 700 g weight for 25 passes. The material was then observed for rubber transfer and the results recorded.

Initial results indicate that the level of marking from debris and rubber transfer was significantly reduced when compared with those of Comparative Example 2 above.

Results of the scrub test for Comparative Examples 1 and 2 are shown in FIGS. 2a-2c.

Figure 3:
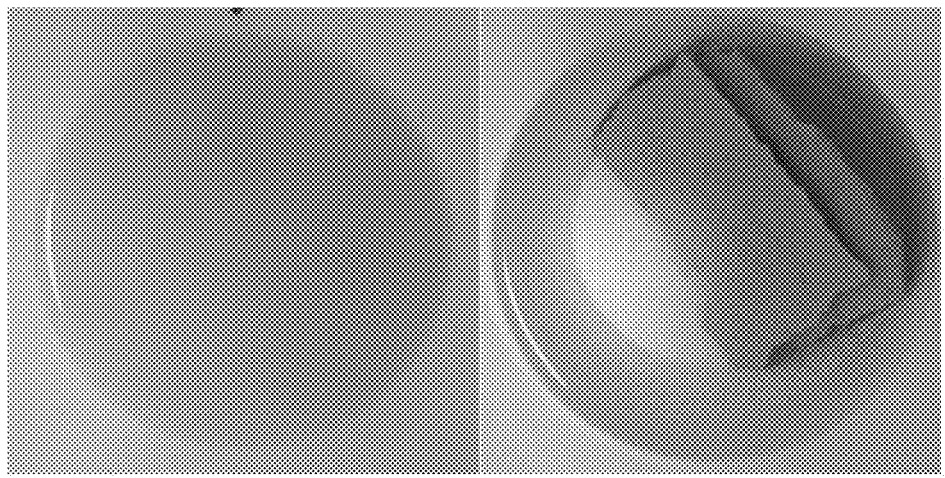
FIG. 3 is a comparison of Comparative Example 1 which suffered from hydrolysis damage versus that of Example 1 (the alkaline resistant formulation) that remained relatively untouched by the "alkalinity test".

To more closely resemble actual field trials at the Atlanta Hartsfield airport, the tire scrub test was developed and performed in the laboratory, the results of which are shown in FIGS. 2a-2c. FIG. 2a indicates that the PA based composition is essentially debris free, while the EVA based composition (FIG. 2b) is not. The PA based composition, however is not alkaline resistant, while the PP/PE based composition (FIG. 2c) is extremely alkaline resistant (see FIG. 3).

It is clear that the ultimate test is to determine visual differences that occur for the preformed thermoplastic markings on actual runways over time. To achieve meaningful results, the testing results for AirMark® (air traffic signage) compositions must be from those produced in four separate colors (yellow, red, black and white).

An additional test, known as the "alkalinity test" simulates the dissolution of the composition on air traffic paved surfaces when the composition is introduced to hot (175° F.) water after being exposed to high alkalinity. Example I composition (right) and the Comparative Example I composition (left) are placed in separate cups filled with 10% of Tide® solution (10% by weight of Tide® detergent in water for 24 hrs. at 115° F.). After 24 hours, the material is rinsed thoroughly and placed in cups with 170° F. water. Comparative Example I suffered from hydrolysis damage while the alkaline resistant formulation of Example I remained relatively untouched. The results of this testing are shown below in FIG. 3.

Results by using the following test methods have been shown to meet or exceed the current specification ranges which are summarized in Table 1 and described below. It should be understood and is hereby noted that the indent values have increased by an order of magnitude over those obtained from comparative Example 1 formulations (thousands of seconds vs. hundreds of seconds prior to dissolution). In addition, bond strength (using a Positest puller) was proven to be better than those obtained using comparative Example 1 formulations.

Test Methodologies

Several test methods used for determining the durability and feasibility of using new formulations for the preform thermoplastics in the applications described herein are provided below:

A. Ring and Ball Test

This test methodology has been developed to determine the softening point for the preform thermoplastic compositions of the present disclosure. The test protocol is as follows;

1.1 Place 2 rings on a hot plate to raise the temperature.
1.2 Fill rings with molten material from the batch.
1.3 Level the material with the top of the rings.
1.4 Place the 2 samples in chilled water to cool.
1.5 Set the 2 samples up in the ASP 5 Auto Softening Point Tester with a ball centered on each sample.
1.6 Start the ASP 5 Auto Softening Point Tester.

B. Indent Value Test

This test methodology has been developed to determine the ability of the preform thermoplastic compositions of the present disclosure to resist impact and indenture after the preform composition has been applied to a paved surface. The protocol is as follows;
  1.1. Pour material into the steel mold, remove material exceeding top of the mold with a spatula (the surface shall be leveled).
  1.2 Put sample in chilled water, (cooler) for 15 minutes.
  1.3 Remove sample from chilled water and place in the indent tester water bath at temperature of 40.0+/−1.0° C. for 1.5 hours.
  1.4 Set the sample up centered in the indent tester equipment and start the test.
  1.5 When the indent reaches 10 mm, the test completes and the equipment will enter the data into the system.
  1.6 The system will indicate if out of specifications.

C. Cold Flow Test

This test methodology has been developed to determine the ability of the preform thermoplastic compositions of the present disclosure to resist creep or percent elongation that may occur leading to distortion of the signage after the preform composition has been applied to a paved surface and exposed to excessive heat. The test protocol is as follows;
  1.1 Place wax paper and silicone mold on the scale.
  1.2 Weigh 8 grams into the silicone mold.
  1.3 Place molten material and mold into the chilled cooling station for 5 minutes.
  1.4 Remove flow "plug" from mold and place into 30° C. water bath for 10 minutes.
  1.5 Remove plug from 30° C. bath and enter the initial weight and diameter of both directions into the system.
  1.6 Place plug onto tar paper.
  1.7 Place tar paper and plug into a flow test oven for 10 minutes at 135° C. unless otherwise specified.
  1.8 After 10 minutes, remove tar paper and plug from oven and place on counter top.
  1.9 Allow to cool.

Results of these tests for the Example 1 composition are summarized in Table 1 below.

TABLE 1

Tests performed indicating Example 1 compositions (all four colors) meet requirements for alkaline and debris resistant air traffic pavement signage (Airmark ®) showing improved indent results.

| Test Performed Example I Composition | | Specification | Result |
|---|---|---|---|
| (White) | | | |
| Indent Value -Lab | Time req'd to get 10 mm depth | >30 sec | 156 sec |
| Flow Test | % increase in overall dimension | 90-190% | 126% |
| R&B Test | Temp resistance | 116-125° C. | 119.0 |
| Alkaline Resistance (Yellow) | "Tide ®" test | | Pass |
| Indent Value - lab | | >30 sec | 163 sec |
| Flow Test | | 90-190% | 187% |
| R&B Test | | 116-125° C. | 120.4 |
| Alkaline Resistance (Red) | | | Pass |
| Indent Value - lab | | >30 sec | 213 sec |
| Flow Test | | 90-190% | 118% |
| R&B Test | | 116-125° C. | 119.5 |
| Alkaline Resistance (Black) | | | Pass |
| Indent Value - lab | | >30 sec | 258 sec |
| Flow Test | | 90-190% | 148% |
| R&B Test | | 116-125° C. | 120.5 |
| Alkaline Resistance | | | Pass |

In addition, DMA (dynamic mechanical analysis) testing was conducted to compare storage moduli of Example 1 with that of Comparative Example 1 compositions. The results are provided in FIG. 4 below, where the higher G' (storage modulus) values are for Example 1 compositions showing significant improvement over the Comparative Example 1 (PA) based composition.

TABLE 2

Figure 4:
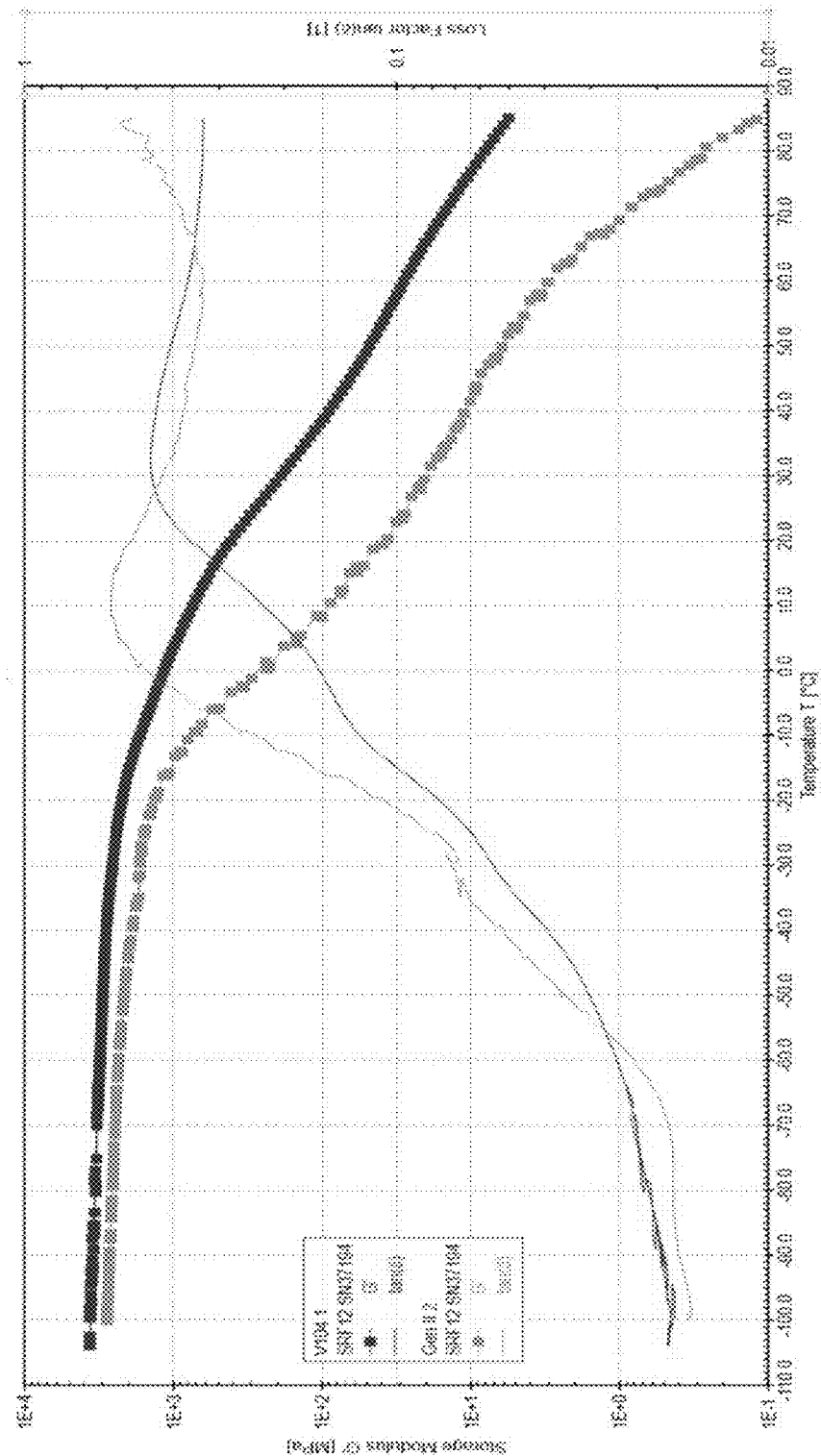
FIG. 4 is a plot indicating the dynamic mechanical analysis Results of DMA testing. The higher G' (storage modulus) values are for Example 1 compositions showing significant improvement over the Comparative Example 1 (PA) based composition.

Storage Modulus Data Comparison from FIG. 4

| Sample | G' @ 77° C. (MPa) |
|---|---|
| Comparative Example 1 (Gen II) 2 | 0.34 |
| Example 1 (V104) | 9.43 |

Additional comparative test data is provided in Table 3 to indicate the surprising results achieved with one representative example (Example 1) of the composition of the present disclosure.

TABLE 3

Summary of Test for Results for Example 1 and Comparative Example 1

| Test Type and Method | Test Results for Example 1 | Test Results for Comp. Ex 1 |
|---|---|---|
| Ring and Ball (° C.) | 119 | 118 |
| Cold Flow (%) | 126 | 150 |
| Indent Values (s) | 156 | 7 |
| Alkalinity Resistance | Pass | Fail |

Although the invention has been described in considerable detail with reference to certain preferred versions thereof; other versions are possible. For example, the coating compositions can include one or more ingredients that enhance other film properties such as gloss, etc. Therefore, the spirit and scope of the claims should not necessarily be limited to the description of the preferred embodiments contained herein.

We claim:

1. A preformed or hot applied thermoplastic marking composition comprising: at least 6 weight percent polypropylene/polyethylene (PP/PE) copolymer and an intermix that exists throughout said thermoplastic marking composition wherein said thermoplastic marking composition is at least 20 weight percent binder resin which comprises between 5 and 15 weight percent of a tackifier resin, between 2 and 12 weight percent titanium dioxide with an optional organic dye, wherein said intermix is at least 30 weight percent of said thermoplastic marking composition and wherein said intermix is an inorganic filler;
  wherein said thermoplastic marking composition also comprises:
  at least 10 weight percent of one or more sterically hindered phenolic antioxidants;
  a heat stabilizer that is a disodium salt of phosphonic acid, and
  at least one of the following:
  at least 1 weight percent of a PE homopolymer wax along with at least 1 weight percent of a non-polar polyethylene component containing 3 weight percent ethylene maleic anhydride yielding a saponification number of 35,
  at least 1 weight percent of alkyd resin and soybean oil mixtures,
  at least 0.5 weight percent of UV stabilizing compounds,
  at least 1 weight percent of an alkyd resin modified glyceryl phthalate, or
  at least 1 weight percent of a polyurethane with a melting point of at least 150 degrees centigrade;
  wherein all weight percentages are based on a total weight of said thermoplastic marking composition.

2. The composition of claim 1, wherein the tackifier resin is a glycerol ester of a rosin resin.

3. The composition of claim 1 wherein the thermoplastic marking composition has a glass transition temperature of 35 degrees Centigrade.

4. The composition of claim 1, wherein the one or more sterically hindered phenolic antioxidants is pentaerythritol tetrakis (3,3,5 di-tert-butyl-4-hydroxyphenyl) propionate).

5. The composition of claim 1, wherein the UV stabilizing compound is poly[(6-morpholino-s-triazine-2,4-diyl) [2,2,6,6-tetramethyl-4-piperidyl)imino]-hexamethylene[(2,2,6,6-tetramethyl-4-piperidyl)imino]).

6. The composition of claim 1, wherein the intermix is at least 60 weight percent of the total thermoplastic marking composition.

7. The composition of claim 1, wherein the intermix is at least 80 weight percent of the total thermoplastic marking composition.

8. The composition of claim 1, wherein the inorganic filler is at least 30 weight percent glass beads and said intermix includes fumed silica, calcium, aggregate and organic pigments.

9. The composition of claim 8, wherein the aggregate comprises quartz, granite, corundum, calcined clay, metal slag or any combination of said quartz, granite, corundum, calcined clay, or metal slag.

10. The preformed or hot applied thermoplastic marking composition of claim 1 wherein the thermoplastic marking composition meets the following test criteria; a range of 116 to 125 degrees Centigrade in a ring and ball test, 90 to 190 percent elongation in a cold flow test, and at least 30 seconds in an indent value test, passes an alkalinity test, and wherein said composition reduces or eliminates debris in a tire scrub test.

11. The preformed or hot applied thermoplastic marking composition of claim 1 wherein marking composition measures a dynamic modulus, G' at 77° C. (MPa) of between 3.0 and 13.0.

12. A preformed or hot applied thermoplastic marking comprising: at least 6 weight percent polypropylene/polyethylene (PP/PE) copolymer, wherein said thermoplastic marking composition includes a planar top surface portion and a bottom planar portion that are coplanar to each other; wherein said bottom planar portion is directly applied to an alkaline substrate wherein alkalinity of said substrate is measured by pH and said pH is greater than 8.0 and wherein said thermoplastic marking is adhered to said substrate via application of heat or pressure or both heat and pressure and wherein said planar top surface portion and bottom planar portion comprises an intermix that exists throughout said thermoplastic marking composition;
  wherein said thermoplastic marking composition also comprises:
  at least 10 weight percent of one or more sterically hindered phenolic antioxidants;
  a heat stabilizer that is a disodium salt of phosphonic acid;
  at least one of the following:
  at least 1 weight percent of a PE homopolymer wax along with at least 1 weight percent of a non-polar polyethylene component containing 3 weight percent ethylene maleic anhydride yielding a saponification number of 35,
  at least 1 weight percent of alkyd resin and soybean oil mixtures,
  at least 0.5 weight percent of UV stabilizing compounds,
  at least 1 weight percent of an alkyd resin modified glyceryl phthalate, or
  at least 1 weight percent of a polyurethane with a melting point of at least 150 degrees centigrade;
  wherein all weight percentages are based on a total weight of said thermoplastic marking composition.

13. The preformed or hot applied thermoplastic marking of claim 12, wherein a portion of the preformed thermoplastic marking utilizes an adhesive for bonding and interlocking one section of a preform to another section of said preform.

14. The preformed or hot applied thermoplastic marking of claim 13, wherein the portion includes patterned markings, wherein said patterned markings are lines, legends, arrows, indicia, including colored surfaces and sections of said surfaces other than or together with a white color.

15. The preformed or hot applied thermoplastic marking of claim 13, wherein the adhesive is sprayable and alkaline resistant, allowing for bridging an intersection on the planar surfaces of a grid section and an insert section such that said grid and insert section form a unified pavement marking pattern and wherein said adhesive includes a PP/PE copolymer based hot melt adhesive.

16. A method of making a preformed or hot applied thermoplastic marking composition for adhesion to an alkaline substrate, the method comprising adhering a thermoplastic marking composition to an alkaline substrate via application of heat or pressure or both heat and pressure:
  wherein said thermoplastic marking composition comprises at least 6 weight percent of a PP/PE copolymer;

wherein said thermoplastic marking composition also includes a planar top surface portion and a planar bottom portion that are coplanar to each other;

wherein said bottom portion is directly applied to said alkaline substrate that exhibits a pH greater than 8.0;

wherein said top surface portion and said bottom surface portion comprises an intermix that exists throughout said thermoplastic marking composition;

wherein said thermoplastic marking composition also comprises:

at least 10 weight percent of one or more sterically hindered phenolic antioxidants;

a heat stabilizer that is a disodium salt of phosphonic acid, and at least one of the following:

at least 1 weight percent of a PE homopolymer wax along with at least 1 weight percent of a non-polar polyethylene component containing 3 weight percent ethylene maleic anhydride yielding a saponification number of 35, at least 1 weight percent of alkyd resin and soybean oil mixtures, at least 0.5 weight percent of UV stabilizing compounds, at least 1 weight percent of an alkyd resin modified glyceryl phthalate, or at least 1 weight percent of a polyurethane with a melting point of at least 150 degrees centigrade;

wherein all weight percentages are based on a total weight of said thermoplastic marking composition.

17. The method of claim 16, wherein the tackifier resin is a glycerol ester of a rosin resin.

18. The method of claim 16, wherein the thermoplastic marking composition has a glass transition temperature of 121 degrees Centigrade.

19. The method of claim 16, wherein the at least one of said sterically hindered phenolic antioxidants is pentaerythritol tetrakis (3,3,5 di-tert-butyl-4-hydroxyphenyl) propionate).

20. The method of claim 16, wherein the UV stabilizing compound is poly[(6-morpholino-s-triazine-2,4-diyl)[2,2,6,6-tetramethyl-4-piperidyl)imino]-hexamethylene[(2,2,6,6-tetramethyl-4-piperidyl)imino]).

21. The method of claim 16, wherein the intermix is at least 60 weight percent of said total composition.

22. The method of claim 16, wherein the intermix is at least 80 weight percent of said total thermoplastic marking composition.

23. The method of claim 16, wherein the inorganic filler is at least 30 weight percent glass beads and wherein said intermix includes calcium carbonate, fumed silica, and aggregate.

24. The method of claim 16, wherein the thermoplastic marking composition is in the form of thermoplastic signage and said thermoplastic signage comprises glass beads that are suspended in and applied on the surface of said thermoplastic signage and wherein when said thermoplastic signage is in a molten state said glass beads do not sink into said thermoplastic signage and said glass beads allow for maintaining an overall retroreflectivity of about 1000 millicandellas/m$^2$/lux (mcd);

the method further comprising providing said thermoplastic signage formed as a continuous sheet wound onto a take-up spool;

subsequently unwinding and conforming said thermoplastic signage to an alkaline substrate;

and subsequently heating said thermoplastic signage to a predetermined temperature to adhere said thermoplastic signage to said alkaline substrate;

wherein said thermoplastic signage comprises features that allow said edges of said signage to physically interconnect and interlock with edges of other signage allowing said continuous sheet to be wound or unwound from spools for specific transportation and site placement.

25. The method of claim 24, wherein the thermoplastic signage is cut to specific lengths and widths conforming with FAA Standards AC 150/53404-1 and AC 150/5340-18 and wherein said specific lengths and widths are selected from the group consisting of touchdown indicia, threshold indicia configurations, aiming point indicia, and centerlines for precision instrument runways.

26. The method of claim 25, wherein the thermoplastic signage includes an alphanumeric symbol on a pavement surface area for surface indicia materials existing on a top surface.

27. The method claim 25, wherein the thermoplastic signage is trafficked after adhering said thermoplastic signage to the alkaline substrate.

28. The method of claim 25, wherein the thermoplastic signage displays specific helicopter landing and takeoff indicia, optionally wherein said specific helicopter landing and takeoff indicia are medical transport indicia.

29. The method of claim 25, wherein the predetermined temperature providing adhesion between the thermoplastic signage and alkaline substrate is about 400 degrees Fahrenheit.

* * * * *